United States Patent

Adamczak et al.

[11] Patent Number: 6,056,100
[45] Date of Patent: May 2, 2000

[54] FRICTION LINER FOR A DRY FRICTION DEVICE, A METHOD OF MAKING SUCH A LINER, AND A CLUTCH FRICTION WHEEL HAVING SUCH A LINER

[75] Inventors: Loïc Adamczak, Montsecret; David Kierbel, Caen; Claude Legrand, Conde sur Noireau; Richard Guerin, Ronfeugerai, all of France

[73] Assignee: Valeo, Paris, France

[21] Appl. No.: 09/035,228

[22] Filed: Mar. 5, 1998

[30] Foreign Application Priority Data

Mar. 6, 1997 [FR] France ................................. 97 02779

[51] Int. Cl.$^7$ .................................................. F16D 69/00
[52] U.S. Cl. ......................................................... 192/107 M
[58] Field of Search ............................ 192/107 R, 107 M; 523/155, 156, 157

[56] References Cited

U.S. PATENT DOCUMENTS

| | | | |
|---|---|---|---|
| 2,354,389 | 7/1944 | Lidkea | 192/107 M |
| 2,403,674 | 7/1946 | Miller et al. | 192/107 M |
| 4,002,225 | 1/1977 | Marin | 192/107 M X |
| 4,418,115 | 11/1983 | Le Lannou . | |
| 5,373,928 | 12/1994 | Werner et al. | 192/107 M X |

FOREIGN PATENT DOCUMENTS

| | | |
|---|---|---|
| 0 183 335 | 6/1986 | European Pat. Off. . |
| 0 526 323 B1 | 11/1995 | European Pat. Off. . |
| 2 717 820 | 9/1995 | France . |
| 2 735 830 | 12/1996 | France . |
| 1-216136 | 8/1989 | Japan . |
| 2 114 586 | 8/1983 | United Kingdom . |

OTHER PUBLICATIONS

English portion of Japanese reference no. 1 216136.
Derwent English abstract of European Patent Specification No. 0 526 323 B1.

*Primary Examiner*—Charles A. Marmor
*Assistant Examiner*—Saul Rodriguez
*Attorney, Agent, or Firm*—Morgan & Finnegan, LLP

[57] ABSTRACT

A friction liner, for a dry friction device such as a clutch friction wheel, or a disk brake for a motor vehicle gearbox, is of flat, annular general form. It comprises a flat annular body of friction material having a cylindrical inner surface and a cylindrical outer surface. At least one annular reinforcing zone is incorporated in the body of the liner.

19 Claims, 2 Drawing Sheets

FRICTION LINER FOR A DRY FRICTION DEVICE, A METHOD OF MAKING SUCH A LINER, AND A CLUTCH FRICTION WHEEL HAVING SUCH A LINER

FIELD OF THE INVENTION

This invention relates to friction liners for dry friction devices, the liner being of a flat, annular general form and being of the type comprising a flat annular body of friction material which is bounded by an inner cylindrical surface and an outer cylindrical surface. The invention also relates to a method of making such a friction liner, and to a rotatable clutch friction wheel for working in dry friction and having at least one friction liner of the kind defined above.

BACKGROUND OF THE INVENTION

Numerous examples of such annular friction liners are known, which are in the form of a flat annular ring, and which are used for equipping a clutch friction wheel or clutch disc, or a disc brake, in either case using dry friction in operation. Each friction liner, in the form of a flat annular ring, is made in the form of a workpiece, that is to say an embryonic or partly finished liner, which undergoes a final curing operation in order to obtain polymerisation of some of its constituents, and this curing operation may in appropriate cases be followed by a post-curing operation.

The flat annular workpiece may, in accordance with various known methods, consist for example of threads which are impregnated with a thermosetting resin, and which are cut to variable lengths of between 5 and 30 mm, the workpiece being preformed in a mould.

Alternatively, it may be based on threads which are impregnated and braided or plaited, the length of the braid or plait corresponding to the outer diameter of the workpiece.

The workpiece may consist of threads which are impregnated and woven, so as to obtain a band of fabric the length of which corresponds to the outer diameter of the workpiece.

Again, the workpiece may be made from impregnated threads which are wound or rolled on a mandrel to the internal diameter of the workpiece, the tube thus obtained by winding being subsequently cut off, or sliced, into lengths, so as to produce a corresponding number of flat annular workpieces to be subsequently completed by curing.

Finally, the workpiece may be made from impregnated threads which are wound or rolled by superimposition of lobes corresponding to the outer diameter of the workpiece.

All the above methods of making the unfinished liners (or workpieces), as described above, have as their main drawback the fact that they result in the production of annular friction liners which have low centrifugal strength, especially under hot conditions, that is to say they have poor resistance to rupture under the effects of centrifugal force; this effect is more marked the higher the working temperature.

Rupture under centrifugal stress is in general due to the fact that the maximum tangential stress in the region of the cylindrical inner surface of the crown-shaped liner exceeds the tensile rupture stress of the friction material of which it is made.

DISCUSSION OF THE INVENTION

An object of the invention is to provide an improved friction liner of the general type mentioned above, in which the centrifugal strength of the liner is improved and its selling cost is reduced.

According to the invention in a first aspect, a friction liner for a dry friction device, the liner being of a flat annular general form and being of the type comprising a flat annular body of friction material bounded by a cylindrical inner surface and a cylindrical outer surface, is characterised in that it includes at least one annular reinforcing zone.

According to a preferred feature of the invention, the annular reinforcing zone is disposed close to the inner cylindrical surface of the liner.

According to another preferred feature of the invention, the liner has several annular reinforcing zones arranged substantially concentrically. Preferably, the annular reinforcing zones are arranged substantially concentrically, the innermost reinforcing zone being in the vicinity of the cylindrical inner surface of the liner. In some preferred embodiments, the concentric annular reinforcing zones are distributed over the whole of the liner between the cylindrical inner surface and the outer surface of the latter. In some embodiments, the annular reinforcing zones are made in a material of the same density. In other embodiments the annular reinforcing zones are made in materials of different densities.

In preferred embodiments having the last mentioned arrangement and with the annular reinforcing zones being disposed substantially concentrically, the innermost one of these zones being in the vicinity of the cylindrical inner surface of the liner, the annular reinforcing zones are made in materials of different densities, with these densities decreasing in a radial direction away from the vicinity of the cylindrical inner surface of the liner.

According to a further preferred feature of the invention, each annular reinforcing zone is a reinforcing ring constituted by a substantially annular cylindrical layer inserted in the flat annular body.

According to yet another preferred feature of the invention, each annular reinforcing zone comprises an organic, mineral and/or metallic reinforcing material.

According to a still further preferred feature of the invention, each annular reinforcing zone comprises a reinforcing material in the form of a continuous thread, a discontinuous thread, fibres, woven material, a braid or plait, or a tape.

Preferably, the liner includes a friction material consisting of a mat of fibres impregnated with a thermosetting resin. In that case, preferably, the said fibres have a length in the range between 40 mm and 120 mm.

Preferably, the fibres are selected among the group of fibres consisting of cotton, viscose, linen, polyacrylonitryl, preoxidised polyacrylonitryl, para-aramide, meta-aramide, and mineral fibres. Examples of such mineral fibres are E-C-R glass, rockwool, and ceramics.

Glass is preferably incorporated in the mat, which may be in the form of random fibres, and/or roving, and/or a textured or bulked mat. The diameters of the glass fibres are preferably in the range between 6 and 21 micrometres. The glass fibres are preferably subjected to adhesive bonding, impregnation with phenolic resin, and/or impregnation with rubber.

In preferred embodiments, powder fillers are incorporated in the mat, and comprise, wholly or partly, any one or more of the following constituents: copper, rockwool, powdered nitryl rubber, carbon black, hexamethylene tetramine, gilsonite, litharge, melamine resin, phenolic resin, sulphur, cardolite, zirconium silicate, iron sulphate, alumina, latex, powdered scrap clutch friction liners, friction liner rectification powders, zinc oxide.

According to the invention in a second aspect, a method of making a friction liner for a dry friction device, the liner being of generally annular flat form and being of the type comprising an annular flat body of friction material, wherein a workpiece consisting of the unfinished annular flat body is made by winding, on a mandrel, a band of predetermined length of a mat of friction material, is characterised in that, during the winding step, at least one length of a band of reinforcing material, having a length sufficient to constitute at least one annular reinforcing zone, is inserted so as to obtain subsequently a friction liner according to the invention in its first aspect.

According to various preferred but optional features, which may be incorporated in the method of the invention either singly, or if desired, in such combinations as are technically possible:

(a) a mixture of fibres of the same nature or of different natures as defined above is made in a mixer;
(b) the mixture is carded so as to form a carded web;
(c) the carded web is napped;
(d) glass is incorporated in the carded web at the instant of napping, this being preferably done between steps (b) and (c) above, with powder fillers being sprinkled on the carded web; and carding is preferably carried out using a wool type card;
(e) the mat is sized to a thickness of between 3 and 10 mm between two heated rollers, the temperature being preferably between 50 and 100° C., and the pressure being preferably between 1 and 10 bars;
(f) the mat is cut into bands, preferably along its length, the width of these bands being preferably between 8 and 25 mm;
(g) the bands thus cut off are welded together using heated plates, preferably at a temperature between 50 and 150° C.; these welded bands are preferably overlapped by an amount in the range between 3 and 20 mm;
(h) the welded band is wound on a roller, with reinforcing material being introduced so as to form an annular ring.

In order to form a device with a coating of friction material, the invention provides the following method:

(i) an annular ring, or in another version a plurality of sectors constituting an annular ring, is cut from the mat made as described above;
(j) the annular ring or plurality of sectors constituting a ring is put in the bottom of a mould;
(k) curing under pressure is carried out in the mould.

According to the invention in a third aspect, a rotatable clutch friction wheel 40, as shown in FIG. 1A, or friction disc, for working under dry friction, includes at least one friction liner in accordance with the invention, which is preferably made in accordance with the method of the invention.

The invention enables a friction liner to be obtained which has good friction characteristics and high resistance to wear, besides its high resistance to centrifugal force.

The invention has the advantage of enabling friction liners to be obtained in which their characteristics of friction and wear resistance on the one hand, and mechanical strength against centrifugal force on the other, can be selected and controlled separately.

Further features and advantages of the invention will appear more clearly on a reading of the following description of some preferred embodiments of the invention, given by way of non-limiting example only and with reference to the accompanying drawings.

DESCRIPTION OF PREFERRED EMBODIMENTS OF THE INVENTION

Figure 1A:
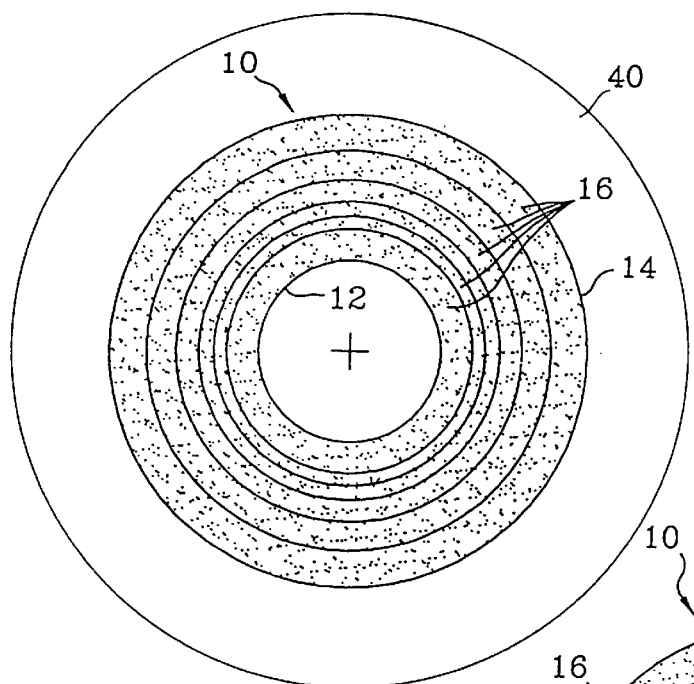
FIG. 1A is a diagrammatic view showing an annular friction liner in accordance with the state of the art.

Reference is first made to FIG. 1A, which shows a friction liner 10 in accordance with the current state of the art. This liner is flat and generally annular, and is bounded by a cylindrical inner surface 12 and a cylindrical outer surface 14.

In one known technique, the flat annular friction liner 10, or at least the whole of the workpiece, that is to say the unfinished liner before its final curing operations, is made for example by winding, on a mandrel having an adjustable diameter, a band of friction material 16, after which, slices are cut from the tube material made in this way by winding. Thus the friction liner is in the form of a succession of adjacent layers of the mat of friction material. For the composition of the friction material and its method of manufacture, reference is invited to what is set forth above, and also to the contents and examples in the specification of French patent application No. 95 07544 of Jun. 21, 1995.

Figure 1B:
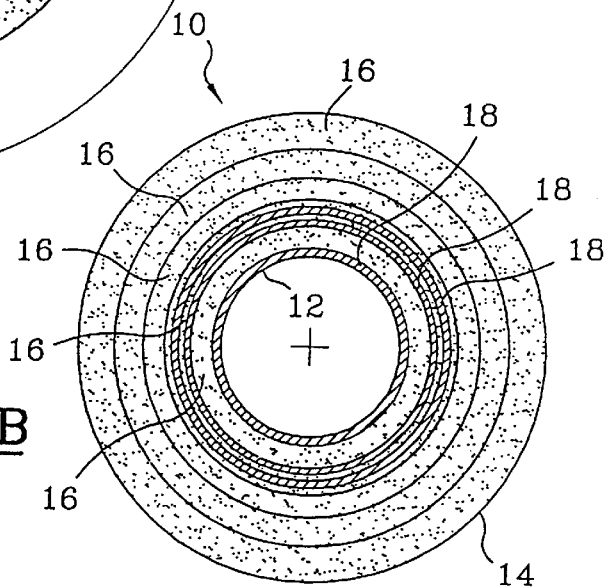
FIG. 1B is a view similar to that in FIG. 1A, but shows a first embodiment of a friction liner in accordance with the present invention.
Figure 1C:
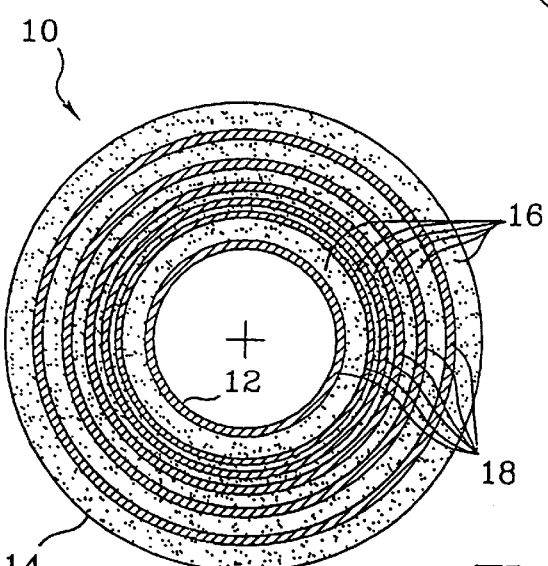
FIG. 1C is a view similar to that in FIG. 1A but shows a second embodiment of a friction liner in accordance with the present invention.

In accordance with features of the present invention, and as shown in FIGS. 1B and 1C to which reference is now made, it is proposed to improve the centrifugal rupture strength of such a friction liner, at least in the vicinity of its cylindrical inner surface 12, by means of at least one annular reinforcing zone. For this purpose, and as can be seen for example in FIG. 1B, several annular reinforcing zones 18 are provided. These zones 18 are arranged concentrically and coaxially. They are interposed between the corresponding annular zones formed in the base friction material that constitutes the flat annular body 16 in accordance with current practice. In the version shown in FIG. 1C, it is the whole of the annular friction liner 10 that is reinforced, that is to say the annular reinforcing zones are distributed over the radial extent of the liner, from the vicinity of the cylindrical inner surface 12 to the vicinity of the cylindrical outer surface 14.

The structure and composition of a reinforced liner, such as those shown in FIGS. 1B and 1C, may for example be as follows. The mat of fibres that constitutes the friction material is in this example made from the six compositions given in the following table in parts by weight.

| FIBRES | EXAMPLES | | | | | |
| --- | --- | --- | --- | --- | --- | --- |
| | A | B | C | D | E | F |
| PAN (polyacrylonitrile) or pre-oxidised PAN | 15 | 13.6 | 12.4 | 9.3 | 8.5 | 7.7 |
| GLASS E | 5 | 4.6 | 4.2 | 9.3 | 8.5 | 7.7 |

The mean length of the fibres used is as follows:
PAN fibres: 42 mm;
glass fibres: 50 mm.

The above fibres, or mixture of fibres mixed in a mixer, are introduced into the loading hopper of a wool-type carder, which includes a feed chimney. On leaving the carder, powder fillers are sprinkled on the carded sheet so formed, by means of a suitable sprinkling device. The powder fillers have the composition given by way of example in the following table, in parts by weight with respect to the parts by weight of fibres given in the preceding table.

| POWDER FILLERS | EXAMPLES | | | | | |
| --- | --- | --- | --- | --- | --- | --- |
| | A | B | C | D | E | F |
| Rectification powders, for rectifying friction liners | 38.1 | 34.6 | 31.7 | 8.2 | 7.5 | 6.7 |
| Phenolic Resin | 37.4 | 34.7 | 31.1 | 19.6 | 17.8 | 16.0 |
| Cardolite | 4.5 | 4.1 | 3.8 | | | |
| Nitrile rubber | | | | 16.2 | 14.7 | 13.2 |
| Sulphur | | | | 3.2 | 2.9 | 2.6 |
| Barium Sulphate | | | | 12.9 | 11.7 | 10.5 |
| Magnesia | | | | 3.3 | 3.0 | 2.7 |
| Melamine Resin | | | | 18.0 | 16.6 | 15.2 |

Each annular reinforcing zone 18 is a ring taken from a band of glass fabric which is inserted in the band of the rolled mat during winding, in the way explained below. The reinforcing woven glass material is for example a unidirectional fabric oriented in the warp direction. The diameter of the glass filaments of which it is made is substantially equal to 17 micrometres.

The reinforcing material has the composition given in the table below, in parts by weight with respect to the parts by weight of fibres and powder fillers set forth in the preceding tables.

| FABRIC | EXAMPLES | | | | | |
| --- | --- | --- | --- | --- | --- | --- |
| | A | B | C | D | E | F |
| Unidirectional glass fibre fabric | 0 | 8.4 | 16.8 | 0 | 8.8 | 17.7 |

It will be understood from the three tables giving the structure and composition set forth above, that Examples A and D are examples without any reinforcing material, that is to say they are examples corresponding to the state of the art shown in FIG. 1A, while Examples B, C, E and F are examples of reinforced liners in accordance with the invention.

Samples of liners made according to the six examples given above were subjected to centrifugation tests performed both hot and cold. The test was carried out in a centrifuge capable of reaching 20,000 revolutions per minute, and equipped with an adjustable automatic speed regulating device, a control tachometer, and a system for heating the test chamber. The test conditions were as follows.

The cold centrifugation test started from zero speed, going to 4,500 to 5,000 revolutions per minute in 7 to 10 seconds, then in excess of 4,500 to 5,000 revolutions per second, with a constant acceleration of 5,000 revolutions per minute in 25 seconds, that is to say 3.33 revolutions per second per second.

The hot acceleration test consisted in applying a constant acceleration of 5,000 revolutions per minute in 25 seconds, that is to say 3.33 revolutions per second per second.

During the hot test, the thermocouple for measuring temperature was positioned in the same plane as the liner (in the form of a crown) under test.

The result of these tests is summarised in the following table.

| Resistance to centrifugation (in rev/min) | | | | | | |
| --- | --- | --- | --- | --- | --- | --- |
| | EXAMPLES | | | | | |
| | A | B | C | D | E | F |
| Cold: 25° C. | 15000 | 16500 | 17700 | 11400 | 13500 | 16300 |
| Hot: 200° C. | 10800 | 13200 | 16500 | 8900 | 10900 | 12900 |

In this table, the maximum values of the rotational velocities given correspond to the onset of rupture due to centrifugal force.

In the case of the three first examples A, B and C, relating to the same combination of composition and structure, it is found that the presence of the reinforcing material considerably increases centrifugal rupture strength under both cold and hot conditions. The same is true in the case of the other three examples, D, E and F, which relate to another combination of structure and composition of the liner.

Figure 2:
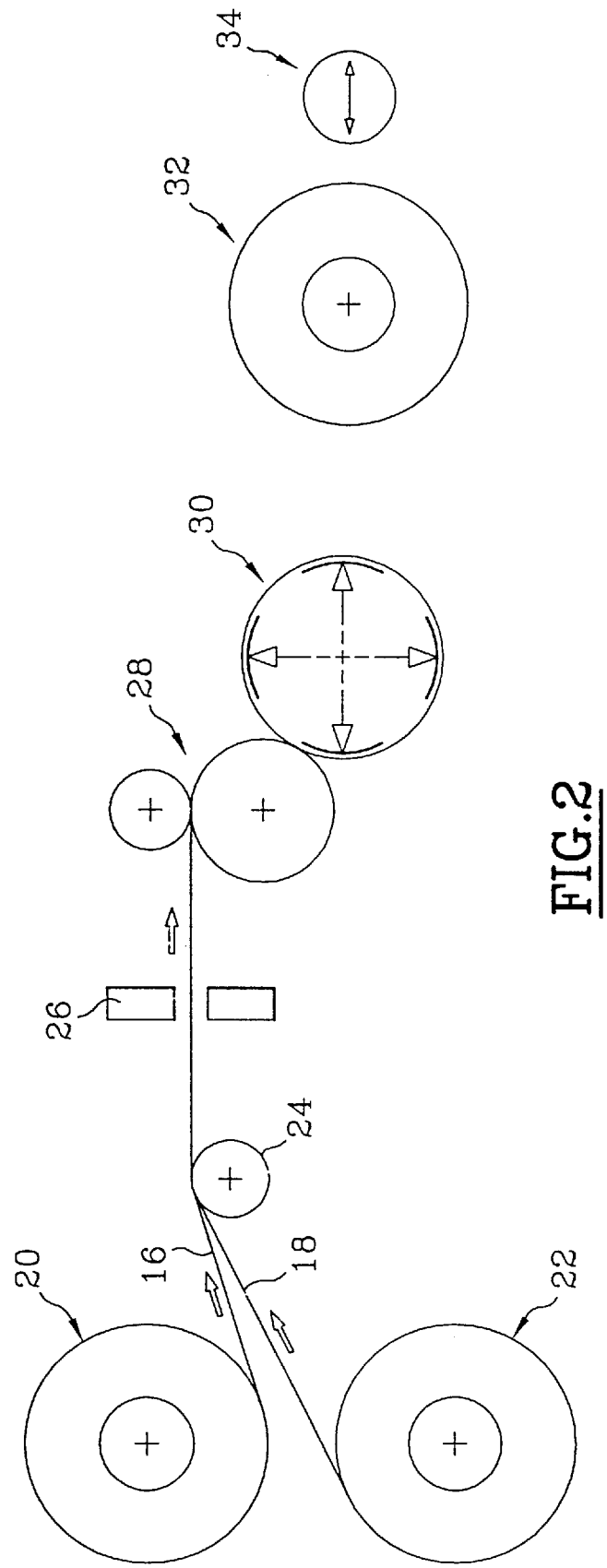
FIG. 2 is a diagram showing part of an installation for performing a method of making a friction liner according to the invention.

An outline description of the method of making a liner in accordance with the invention will now be given with reference to FIG. 2. FIG. 2 shows a roller 20 for rolling the band of friction material which will constitute the layers 16, together with a roller 22 for compressing the band of reinforcing material which is to constitute the annular reinforcing layers 18.

The two bands 16 and 18 are brought together by passing them over an intermediate idle roller 24, after which the velocity and length of forward motion are controlled by a sensor 26.

The two bands are joined together by passing them between a pair of heated cylinders 28 so that they are wound concentrically on a mandrel 30 of adjustable diameter, which forms a tube 32 from the bands 16 and 18. This tube is subsequently divided into flat annular slices by rotary cutters 34.

If the bands 16 and 18 drawn from the rollers 20 and 22 are joined together continuously, that is to say during the winding of a complete tube 32, the resulting friction liner is a liner of the type shown in FIG. 1C, that is to say it is a liner which has annular reinforcing layers over its whole surface, i.e. reinforcing layers which are distributed over the radial extent of the tube from the inside to the outside. However, if it is required to obtain a liner which is reinforced only in the vicinity of its cylindrical inner surface 12, as in FIG. 1B for example, it is necessary to interrupt the feed of the band of reinforcing material 18 from the roller 22 at the end of a predetermined time, and to continue winding the band 16 by itself so as to form the tube 32.

In a known way, the inner and outer diameters of the tube 32, that is to say those of the liners 10 which are subsequently cut from the tube, are the result of appropriate selection of the diameters of the adjustable mandrel and of the length of the band or bands wound on the mandrel.

What is claimed is:

1. A friction liner for a dry friction device, the liner having a flat, annular general form and comprising a flat annular body of friction material defining a cylindrical inner surface and a cylindrical outer surface and including a plurality of annular reinforcing zones arranged substantially concentrically, wherein the reinforcing zones are made of materials of different densities.

2. The liner according to claim 1, wherein one of the reinforcing zones is close to the inner surface.

3. The liner according to claim 1, wherein the reinforcing zones are disposed over the radial extent of the liner, the innermost zone being in the vicinity of the inner surface.

4. The liner according to claim 1, wherein the reinforcing zones are distributed over substantially the whole radial extent of the liner between the inner and outer surfaces.

5. The liner according to claim 1, wherein each annular reinforcing zone comprises a reinforcing ring in the form of a substantially annular cylindrical layer inserted in the body.

6. The liner according to claim 1, wherein each annular reinforcing zone is of at least one material selected from the group consisting of organic materials, mineral materials and metallic materials.

7. The liner according to claim 1, wherein each annular reinforcing zone comprises reinforcing materials in a form selected from a continuous thread, a discontinuous thread, fibres, woven fabric, braid and tape.

8. The liner according to claim 1, wherein the body comprises a friction material consisting of a mat of fibres impregnated with thermosetting resin.

9. The liner according to claim 8, wherein the length of the fibres is in the range of 40 to 120 mm.

10. A rotatable clutch friction wheel for dry friction working, comprising at least one friction liner according to claim 1.

11. A friction liner for a dry friction device, the liner having a flat, annular general form and comprising a flat annular body of friction material defining a cylindrical inner surface and a cylindrical outer surface and including a plurality of annular reinforcing zone arranged substantially concentrically, wherein the reinforcing zones are disposed over the radial extent of the liner, the innermost zone being in the vicinity of the inner surface, and wherein each said reinforcing zone has a smaller density than the next reinforcing liner that is arranged concentrically therewith at a smaller radius.

12. The liner according to claim 11, wherein one of the reinforcing zones is close to the inner surface.

13. The liner according to claim 11, wherein the reinforcing zones are distributed over substantially the whole radial extent of the liner between the inner and outer surfaces.

14. The liner according to claim 11, wherein each annular reinforcing zone comprises a reinforcing ring in the form of a substantially annular cylindrical layer inserted in the body.

15. The liner according to claim 11, wherein each annular reinforcing zone is of at least one material selected from the group consisting of organic materials, mineral materials and metallic materials.

16. The liner according to claim 11, wherein each annular reinforcing zone comprises reinforcing materials in a form selected from a continuous thread, a discontinuous thread, fibres, woven fabric, braid and tape.

17. The according to claim 11, wherein the body comprises a friction material consisting of a mat of fibres impregnated with thermosetting resin.

18. The liner according to claim 17, wherein the length of the fibres is in the range of 40 to 120 mm.

19. A rotatable clutch friction wheel for dry friction working, comprising at least one friction liner according to claim 11.

* * * * *